(12) United States Patent
Huang (10) Patent No.: US 8,912,927 B1
(45) Date of Patent: Dec. 16, 2014

(54) METHOD FOR DETERMINING INCLINE ANGLE OF ELECTROMAGNETIC POINTER (71) Applicant: Waltop International Corp., Hsinchu (TW)

(72) Inventor: Tung-Chuan Huang, Hsinchu City (TW)

(73) Assignee: Waltop International Corp., Hsinchu (TW)

( * ) Notice: Subject to any disclaimer, the term of this patent is extended or adjusted under 35 U.S.C. 154(b) by 0 days.

(21) Appl. No.: 14/084,939

(22) Filed: Nov. 20, 2013

(30) Foreign Application Priority Data

Jun. 18, 2013 (TW) .............................. 102121583 A (51) Int. Cl.
*H03M 1/22* (2006.01)
*G06F 3/0354* (2013.01)

(52) U.S. Cl.
CPC .................................. *G06F 3/03545* (2013.01)
USPC ........................................ 341/5; 341/1; 341/9

(58) Field of Classification Search
CPC ............. G06F 3/03545; G06K 7/1036; G06K 7/10446
USPC ....................................................... 341/1, 5, 9
See application file for complete search history.

(56) References Cited

U.S. PATENT DOCUMENTS 5,751,229 A    5/1998  Funahashi

FOREIGN PATENT DOCUMENTS

TW          201128461        8/2011

*Primary Examiner* — Peguy Jean Pierre
(74) *Attorney, Agent, or Firm* — Kirton McConkie; Evan R. Witt (57) ABSTRACT

A method for determining an incline angle of an electromagnetic pointer is provided. The electromagnetic pointer is positioned on or above a digitizer which has a plurality of loop antennas. The method comprises steps of: locating a peak-value loop antenna which has a maximum inductive signal value; scanning plural loop antennas that are near to the peak-value loop antenna so as to obtain a signal distribution; simulating at least two signal curves by using signal values sensed by the peak-value loop antenna and the neighboring loop antennas; calculating a rate of change between every two signal curves; and determining an incline angle of the electromagnetic pointer by looking up a conversion table with the calculated rate of change. The present invention only needs to scan five to seven loop antennas to determine the incline angle, thereby increasing the efficiency of incline angle determination.

8 Claims, 7 Drawing Sheets

METHOD FOR DETERMINING INCLINE ANGLE OF ELECTROMAGNETIC POINTER

TECHNICAL FIELD OF THE INVENTION

The present invention relates to determination of the coordinate of an electromagnetic pointer, and more particularly, to a method for determining an incline angle of the electromagnetic pointer.

BACKGROUND OF THE INVENTION

The coordinate of an electromagnetic pointer or pen is obtained through the transmitting and receiving of electromagnetic waves between loop antennas on a digitizer and the electromagnetic pointer. Signal values sensed by each loop antenna may alter as the incline angle of the electromagnetic pointer changes. Traditionally, the incline angle of the electromagnetic pointer is determined firstly, and then the incline angle is used to compensate coordinate estimation.

A conventional method for determining an incline angle of an electromagnetic pointer disclosed in U.S. Pat. No. 5,751,229 utilizes a main peak value (i.e., a value of a main peak in a diagram of voltage signal distribution in X or Y coordinates) and a sub peak value (i.e., a value of a sub peak in the diagram of voltage signal distribution in X or Y coordinates) of inductive voltage distribution to calculate the incline angle. However, in this conventional method, when the electromagnetic pointer is perpendicular to X axis and tilts along Y axis, the ratio of the main peak value to the sub peak value will vary because the main peak value and the sub peak value in X axis are changed correspondingly. Therefore, the accuracy of the inclined angle calculation would be affected.

Another conventional method for determining an incline angle of an electromagnetic pointer disclosed in Taiwan patent publication NO. 201128461 utilizes signal peak values at the left side and right side of a position at where the electromagnetic pointer is located, to calculate the ratio of the left peak value to the right peak value such that the incline angle of the electromagnetic pointer is estimated.

Both of the two conventional methods need to scan lots of loop antennas (e.g., 13 entities) to obtain the signal peak values at left and right sides. This results in low efficiency of incline angle determination. An inactive area on the periphery of the digitizer is large and the range of effective area is limited.

SUMMARY OF THE INVENTION

An objective of the present invention is to provide a method for determining an incline angle of an electromagnetic pointer, for reducing the number of loop antennas required to be scanned and increasing the efficiency of incline angle determination.

In order to achieve the above objective, the present invention provides a method for determining an incline angle of an electromagnetic pointer. The electromagnetic pointer is positioned on or above a digitizer which has a plurality of loop antennas. The method comprises steps of: A. locating a peak-value loop antenna which has a maximum inductive signal value; B. scanning plural loop antennas that are near to the peak-value loop antenna and obtaining seven inductive signal values from seven loop antennas among the peak-value loop antenna and the neighboring loop antennas; C. simulating one signal curve with a cubic equation in one variable for every four adjacent points taken from the seven signal values, in which highest-ordered parameters for four signal curves obtained from the simulation respectively are $A_{-2}$, $A_{-1}$, $A_0$, and $A_1$ in order; D. defining following variables by calculating variations among the signal curves:

$$\text{Index1} = A_0 - A_{-1}$$

$$\text{Delta}L = A_0 - A_{-2}$$

$$\text{Delta}R = A_1 - A_{-1}$$

$$\text{Index2} = \text{Delta}L - \text{Delta}R;$$

E. determining an inductive distance between the electromagnetic pointer and the digitizer according to values of DeltaL and DeltaR; and F. determining an incline angle of the electromagnetic pointer by using values of Index1 and Index2 to look up an incline angle conversion table.

In the present invention, at least two signal curves are simulated by using the signal values sensed by the loop antennas and the incline angle of the electromagnetic pointer is estimated on a basis of the rate of change between every two signal curves. In this approach, the incline angle can be determined by scanning only five to seven loop antennas. A filtering algorithm and historical tracks also may be incorporated to acquire more accurate incline angle when few loop antennas are scanned. Also, compared to determining the incline angle by scanning lots of loop antennas (e.g., 13 entities) in a conventional method, the present invention can reduce the number of loop antennas required to be scanned and increase the efficiency of incline angle determination, thereby shrinking the inactive area on the periphery of the digitizer and enlarging the range of effective area.

DETAILED DESCRIPTION OF THE INVENTION

Figure 1:
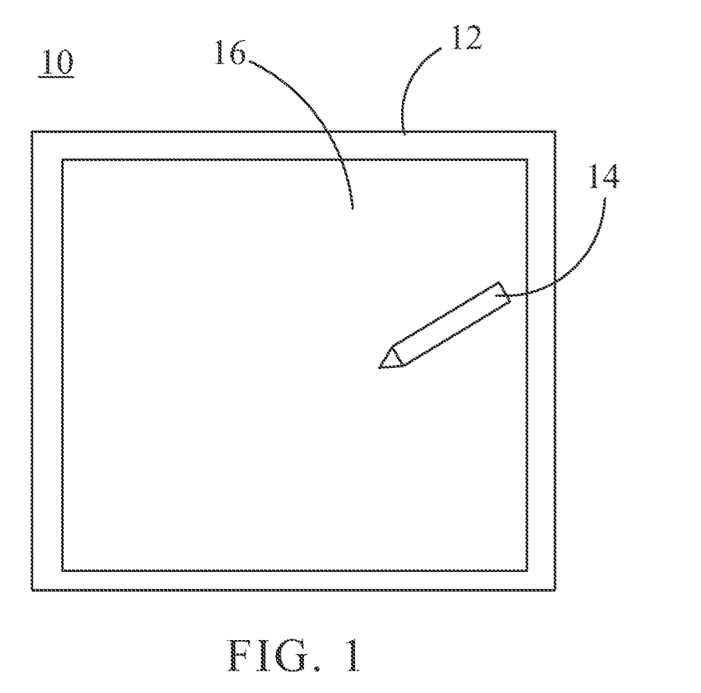
FIG. 1 is a schematic diagram showing an electromagnetic input system implemented according to one embodiment of the present invention.

FIG. 1 is a schematic diagram showing an electromagnetic input system implemented according to one embodiment of the present invention. The electromagnetic input system 10 comprises a digitizer 12 and an electromagnetic pointer or pen 14. The digitizer 12 has an antenna area 16 and a control circuit board (not shown). The antenna area 16 is constructed by a plurality of conductors or sensing coils (see FIG. 2) arranged along X and Y directions. The control circuit board includes a micro-controller unit (MCU) and signal processing circuits such as antenna loop switches, a signal filter, a signal amplifier, and an analog to digital (A/D) converter. The electromagnetic pointer 14 has a resonance circuit disposed therein. The coordinate of the electromagnetic pointer 14 is obtained through the transmitting and receiving of electromagnetic waves between the resonance circuit of the electromagnetic pointer 14 and the loop antennas of the digitizer 12.

Figure 2:
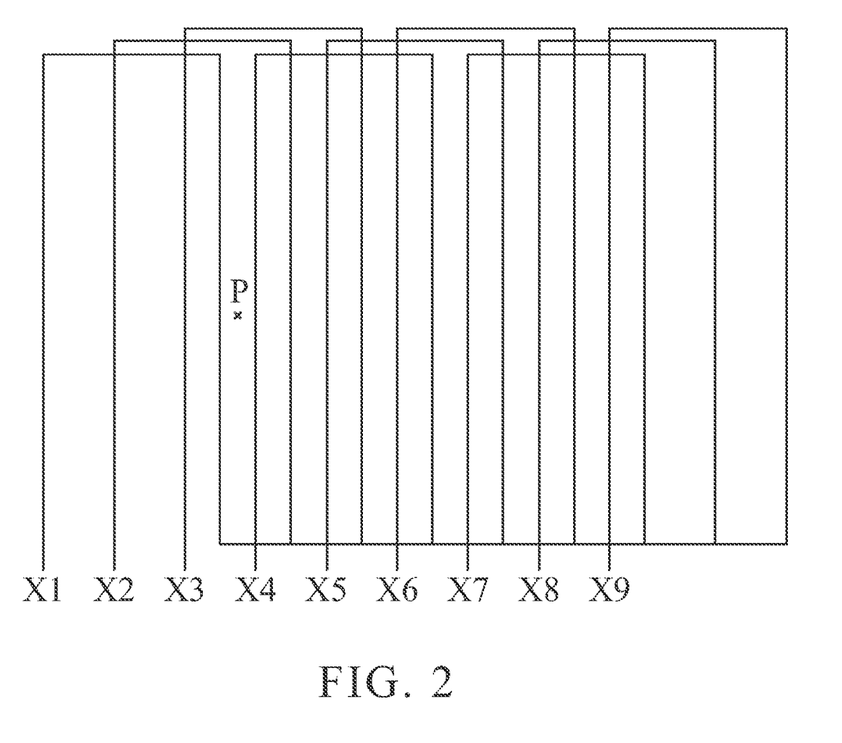
FIG. 2 is a schematic diagram showing partial layout of loop antennas arranged along X axis on an antenna area shown in FIG. 1.

FIG. 2 is a schematic diagram showing partial layout of loop antennas arranged along X axis on the antenna area 16 shown in FIG. 1. As shown in FIG. 2, each of the loop antennas X1 to X9 has an initial terminal and an ending terminal. The respective ending terminals are all connected to the ground. The enclosed area starting from the initial terminal to the ending terminal is almost the same for each loop antenna. Additionally, for example, an area enclosed by the loop antenna X1 overlaps anther two loop antennas X2, X3. That is, an area enclosed by one loop antenna contains the initial terminals of next two loop antennas. That is to say, the ranges of electromagnetic induction for adjacent loop antennas overlap each other. On the antenna area 16, a layout of antennas in Y axis is similar to that of antennas in X axis but X-axis antennas and Y-axis antennas are orthogonal to each other.

Assuming that the electromagnetic pointer 14 is located at position P on the surface of the digitizer 12, the magnetic field generated by the electromagnetic pointer 14 on the point P can induce electronic currents in the respective neighboring loop antennas (e.g., X1 to X5). Based on the inductive signals, the coordinate of the point P can be calculated.

In the process of obtaining the signal values sensed by the loop antennas, which one of loop antennas (e.g., X3) is relatively near to the electromagnetic pointer 14 can be initially determined when a global scan is carried on, and then a local scan is performed, i.e., only scanning several loop antennas (e.g., X1 to X5) that are near to the loop antenna X3, so as to obtain induced voltage values of the respective loop antennas and use them for the calculation.

Figure 3:
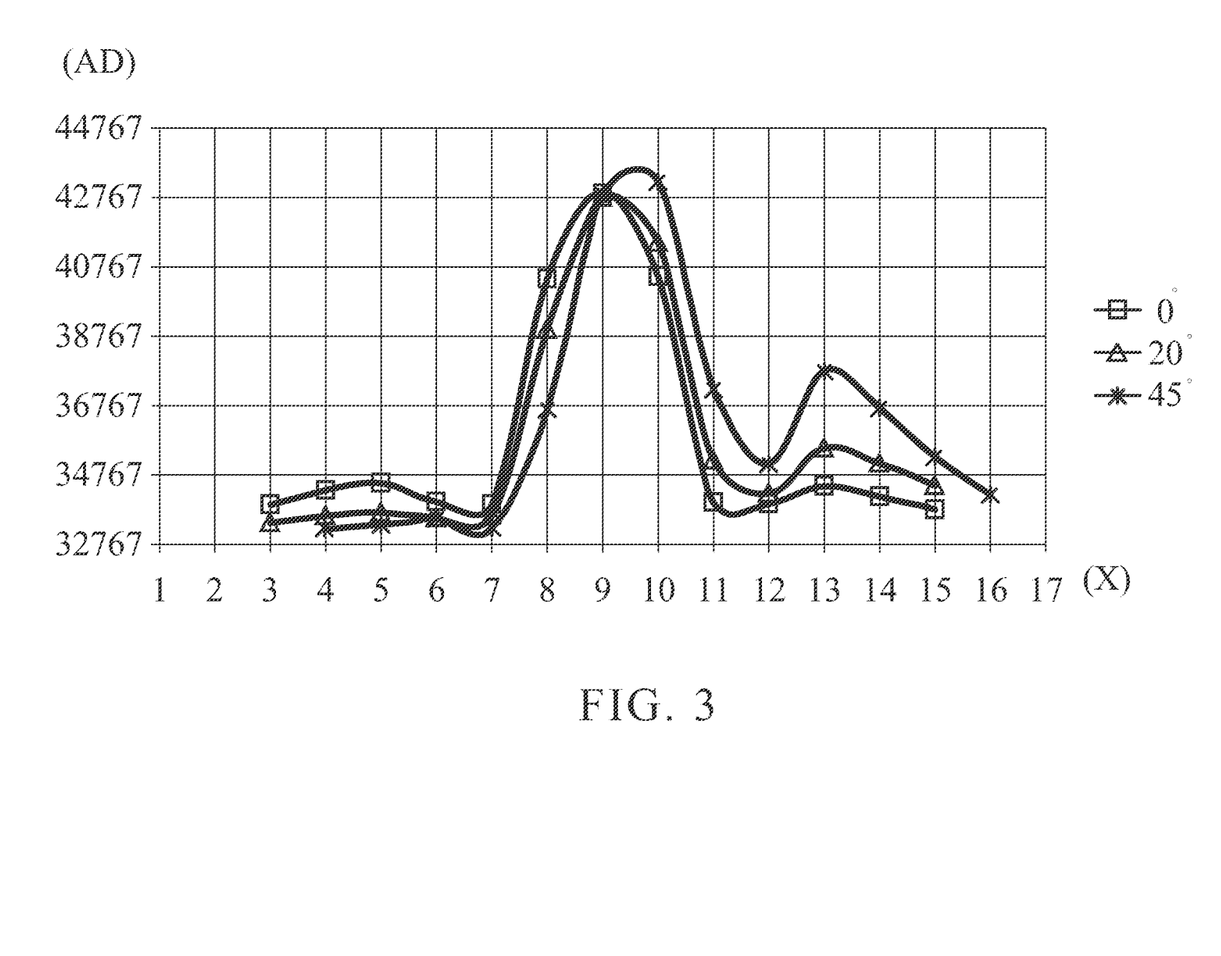
FIG. 3 is a schematic diagram showing a distribution of signal values sensed by the loop antennas.

FIG. 3 is a schematic diagram showing a distribution of the signal values sensed by the loop antennas. Generally speaking, the signal distribution sensed by the loop antennas may be affected by (1) an incline angle of the electromagnetic pointer 14, (2) an inductive distance between the electromagnetic pointer 14 and the digitizer 12, and (3) a position on a single loop antenna where the electromagnetic point 14 is located at.

When the electromagnetic pointer 14 is perpendicular to the surface of the antenna area 16 of the digitizer 12 and is located at a center of some particular loop antenna, the signal distribution basically shows bilateral symmetry and the left-side peak value is substantially the same as the right-side peak value, as shown in FIG. 3. However, when the electromagnetic pointer 14 inclines toward the right side, the right-side peak value increases such that the right-side peak value is greater than the left-side peak value. When the electromagnetic pointer 14 inclines toward the left side, the left-side peak value increases such that the left-side peak value is greater than the right-side peak value. In the case that the electromagnetic pointer 14 inclines toward the right side, along with the increase of incline angle (e.g., from 20° to 40°), the right-side peak value increases and the signal distribution varies as well. Meanwhile, the central peak value may move to next loop antenna.

Figure 4:
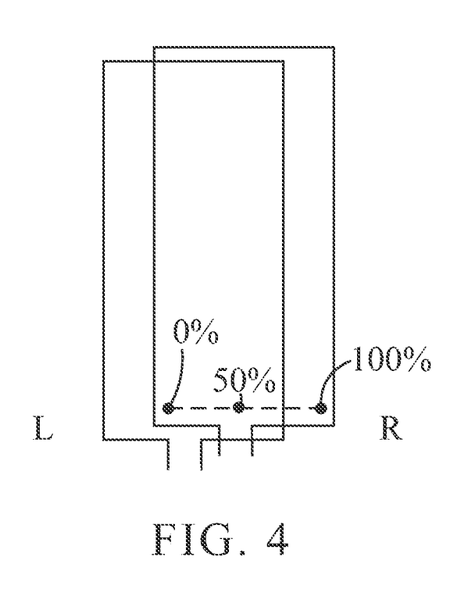
FIG. 4 is a schematic diagram showing percentage position of a loop antenna at where an electromagnetic pointer is located.

Also, a relative position on a single loop antenna where the electromagnetic pointer 14 is located at affects the signal distribution. Referring to FIG. 4, the central position on the loop antenna is defined as 50% position, the leftmost position on the loop antenna is defined as 0% position, and the rightmost position on the loop antenna is defined as 100% position. When the electromagnetic pointer 14 is at right angles and is located at 50% position, the signal distribution basically shows bilateral symmetry. The signal distribution may slightly moves toward the left side when the electromagnetic pointer 14 is located at 0% position, and the signal distribution may slightly moves toward the right side when the electromagnetic pointer 14 is located at 100% position.

The coordinate of the electromagnetic pointer 14 can be estimated by various approaches. For example, one approach to estimate the coordinate of the electromagnetic pointer 14 is to use the following formula, i.e., $$\frac{AD_{Max} - AD_{Left}}{(AD_{Max} - AD_{Left}) + (AD_{Max} - AD_{Right})} \quad (1)$$

where $AD_{Max}$ is a maximum signal peak value, $AD_{Left}$ is a signal value sensed by a loop antenna that is located at the left side of the antenna having the maximum peak value, and $AD_{Right}$ is a signal value sensed by a loop antenna that is located at the right side of the antenna having the maximum peak value. For example, assuming that the signal peak value appears on the loop antenna X9 shown in FIG. 3, then the signal values of the loop antennas X8 and X10 are both used to estimate the coordinate of the electromagnetic pointer 14, i.e., $$(AD9-AD8)/[(AD9-AD8)+(AD9-AD10)]$$

The values of $AD_{Right}$ and $AD_{Left}$ will be apparently affected when the electromagnetic pointer 14 inclines. The incline angle has certain relations with the values of $AD_{Right}$ and $AD_{Left}$. Generally, the calculation of incline angle of the electromagnetic pointer 14 is to compensate the values of $AD_{Right}$ and $AD_{Left}$, and further the estimated coordinate is compensated such that a finally determined coordinate of the electromagnetic pointer 14 is more accurate. This can be achieved by traditional compensation methods and is not detailed herein. In addition, after the incline angles of the electromagnetic pointer 14 with respect to X direction and Y direction are respectively calculated, coordinate compensation can be carried out by using traditional approaches.

The following descriptions will introduce a method for determining an incline angle of an electromagnetic pointer in the present invention and include its principle and concept.

All the curves shown in FIG. 3 can be described by a function defined by a polynomial of eleven degrees in one variable, i.e., $ax^{11}+bx^{10}+\ldots =y$. In advance, measure signal values of the respective loop antennas under various position percentages and various incline angles, calculate a parameter set (i.e., a, b, . . . ) for each specific curve, and then make a conversion table indicating the relations between the position percentage, the incline angle, and the parameter set. In the process of determining the actual coordinate of the electromagnetic pointer, a parameter set that meets a signal distribution curve is estimated by using measured signal values, and then this parameter set is compared with a parameter set recorded in the conversion table such that the position percentage and the incline angle of the electromagnetic pointer can be obtained. However, this approach requires a large amount of calculations, and thus is not feasible since the existing microprocessor has limited computational power.

When the incline angle of the electromagnetic pointer is 0°, the signal distribution curve is laterally symmetrical. The larger the incline angle is, the higher the asymmetry of the curve becomes and the larger the rate of change of the curve will be. Accordingly, the rate of change of the curve may be used to estimate the incline angle of the electromagnetic pointer.

Figure 5:
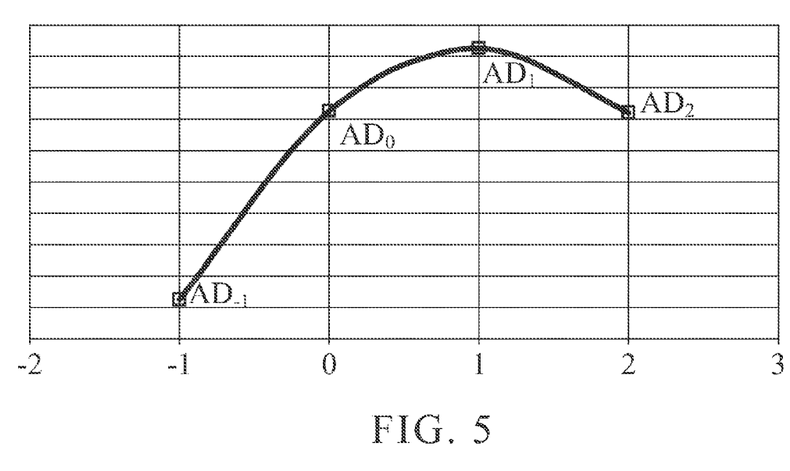
FIG. 5 is a schematic diagram showing a simulated signal curve.

Assuming that a cubic equation in one variable (i.e., $ax^3+bx^2+cx+d=y$) is used to describe the signal distribution curve, then there needs four points to calculate the parameter set (i.e., a, b, c, d). That is, four sensing values (AD) corresponding to four loop antennas are required. Referring to a signal distribution diagram shown in FIG. 5, some particular loop antenna (preferably a loop having a maximum value of AD or a nearby loop) is set as a center, and its signal value is represented as $AD_0$. For example, take one point (having a value of $AD_{-1}$) from the left side of the center, take two points (having values respectively of $AD_1$ and $AD_2$) from the right side of the center, and use these four points to simulate or describe a curve. The coordinates of the four points are respectively substituted into the aforesaid cubic equation, and the following equations are obtained, i.e., $-a+b-c+d=AD_{-1}$, $d=AD_0$, $a+b+c+d=AD_1$, $8a+4b+2c+d=AD_2$. Accordingly, the parametric solution is obtained as follows.

$$a = \frac{AD_2 - 5AD_0 - 3AD_1 - AD_{-1}}{6} \quad (2)$$

$$b = \frac{AD_1 + AD_{-1} - 2AD_0}{2}$$

$$c = \frac{-AD_2 + 5AD_0 + 6AD_1 - 2AD_{-1}}{6}$$

$$d = AD_0$$

Assuming that the incline angle of the electromagnetic pointer is 0° and is right located on the center of the $9^{th}$ loop antenna, the AD values of the $9^{th}$ loop antenna and two loop antennas on the left and the same numbers on the right are listed below.

TABLE 1

| Loop | AD value |
| --- | --- |
| 7 | 34000 |
| 8 | 40000 |
| 9 | 42000 |
| 10 | 40000 |
| 11 | 34000 |

Figure 6A:
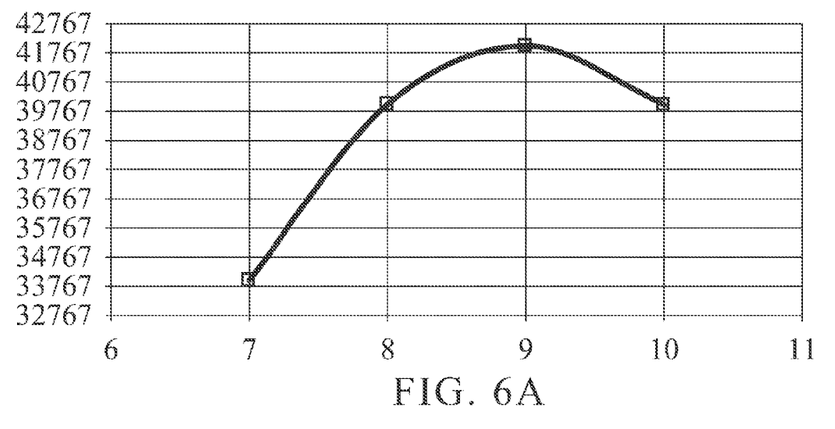
FIG. 6A is a schematic diagram showing a signal curve simulated by using the $8^{th}$ loop antenna as a center.
Figure 6B:
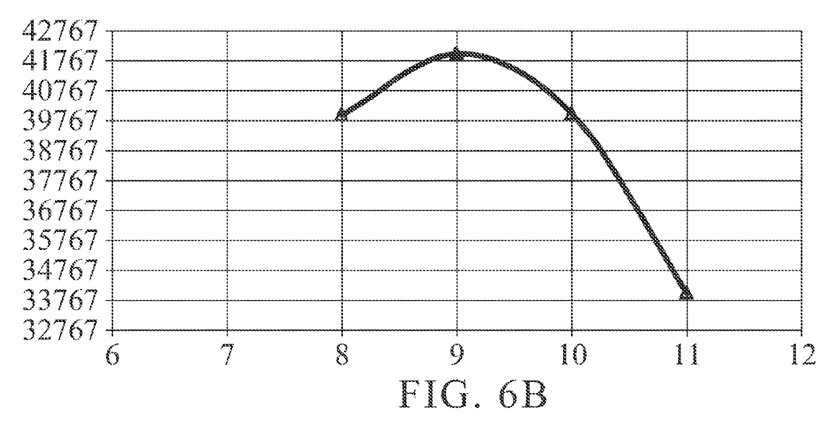
FIG. 6B is a schematic diagram showing a signal curve simulated by using the $9^{th}$ loop antenna as a center.

The signal curve simulated by taking the $8^{th}$ loop antenna as the center point is shown in FIG. 6A, and a parameter set corresponding to the curve shown in FIG. 6A is calculated by using the aforesaid formula (2). The signal curve simulated by taking the $9^{th}$ loop antenna as the center point is shown in FIG. 6B, and a parameter set corresponding to the curve shown in FIG. 6B is calculated by using the aforesaid formula (2). In order to facilitate the observation and comparison, all the parameters are divided by d and then the result is multiplied by 1000, as shown in the following table.

TABLE 2

| | A | B | C | D |
| --- | --- | --- | --- | --- |
| $8^{th}$ point | −1333.33 | −50 | −1075 | 1000 |
| $9^{th}$ point | −1333.33 | −47.619 | −1000 | 1000 |

As can be seen, the highest-ordered parameter (i.e., the parameter A) significantly affects the variation of signal curve. Accordingly, the parameter A can be taken as subjects of comparison when two curves are to be compared to each other. The signal distribution is laterally symmetrical when the incline angle of the electromagnetic pointer is 0°. As shown in Table 2, the parameter A corresponding to the curve obtained by using the $8^{th}$ point is the same as the parameter A corresponding to the curve obtained by using the $9^{th}$ point. This indicates that the rate of change between the two curves is zero.

Since analog signals obtained from electromagnetic induction are very weak, the signals will be processed by an amplifier, and then filtered, rectified, and converted into digital signals. As the signal strength varies, the gain of the amplifier is changed dynamically. This results in inconsistent AD values. As described, all the parameters of the simulated curve are divided by d (i.e., $AD_0$). This is similar to normalize the parameters.

Assuming that the incline angle of the electromagnetic pointer is 0° but the electromagnetic pointer is not falling into the center of the $10^{th}$ loop antenna, the following is to observe the rate of change of the curves when the electromagnetic pointer is located at positions of 5% to 95%. The difference between the two parameters A respectively of the curve obtained by using the $8^{th}$ point and the curve obtained by using the $9^{th}$ point is shown in the following table.

TABLE 3

| | 5% | 15% | 25% | 35% | 45% | 55% | 65% | 75% | 85% | 95% |
| --- | --- | --- | --- | --- | --- | --- | --- | --- | --- | --- |
| ΔA | 7.2 | 7.37 | 6.83 | 6.9 | 6.83 | 7.11 | 6.99 | 6.94 | 7.63 | 8.07 |

As can be seen, when the electromagnetic pointer shits between different locations on a single loop antenna, the difference between the two parameters A is not large. That is, the variation between the two simulated signal curves is not significant.

The objective now is to simulate one signal curve with a cubic equation in one variable for every four adjacent points. There are four signal curves totally obtained. The highest-ordered parameters for the four signal curves obtained from the simulation respectively are $A_{-2}$, $A_{-1}$, $A_0$, and $A_1$, listed from the left to the right. Also, the variables Index1, DeltaL, DeltaR, and Index2 are defined as follows.

$$\text{Index1} = A_0 - A_{-1}$$

$$\text{Delta}L = A_0 - A_{-2}$$

$$\text{Delta}R = A_1 - A_{-1}$$

$$\text{Index2} = \text{Delta}L - \text{Delta}R \quad (3)$$

Then, observe the changes in values of theses variables when the incline angle, the position percentage, and the inductive distance (or height) of the electromagnetic pointer are changed respectively.

Assuming that the electromagnetic pointer is located in the $10^{th}$ loop antenna, the inductive distance between the electromagnetic pointer and the digitizer is 6 mm, and the position percentage is 60%, the following is to observe the rate of change of the curves when the incline angle of the electromagnetic pointer is 0° to 50°. In the case that the electromagnetic pointer inclines toward the right side, the values of Index1 and Index2 vary as follows.

TABLE 4

|        | 0°      | 10°      | 20°      | 30°      | 40°      | 50°      |
|--------|---------|----------|----------|----------|----------|----------|
| Index1 | 6.98795 | 7.17225  | 7.64867  | 8.16129  | 11.0644  | 13.0783  |
| Index2 | 1.94188 | −1.47596 | −572075  | −9.03862 | −1.00735 | −2.51055 |

In the case that the electromagnetic pointer inclines toward the left side, the results are listed below.

TABLE 5

|        | 0°      | 10°     | 20°     | 30°     | 40°     | 50°     |
|--------|---------|---------|---------|---------|---------|---------|
| Index1 | 6.98795 | 7.27011 | 7.04185 | 7.53094 | 7.79811 | 8.17985 |
| Index2 | 1.94188 | 6.0368  | 9.6916  | 14.0715 | 18.7704 | 26.549  |

As can be seen, at the time the electromagnetic pointer located at a position near the center of a loop antenna inclines at different angles, the larger the incline angle, the larger the value of Index1 (except that the pointer inclines toward the left side at 10° to 20°). When the maximum AD value falls in the $10^{th}$ loop antenna, the value of Index2 decreases as the incline angle the pointer inclines toward the right side increases and the value of Index2 increases as the incline angle the pointer inclines toward the left side increases. However, when the incline angle is 40° and 50° toward the right side, the maximum AD value actually is not falling in the $10^{th}$ loop antenna but it is supposed to be in the $11^{th}$ loop antenna. Accordingly, when the value of Index1 is greater than a predetermined value (e.g., 9), the position of the electromagnetic pointer should be modified by a pitch or a loop unit. For example, when the electromagnetic pointer inclines toward the right side for 40° and 50°, the electromagnetic pointer actually is falling in the $10^{th}$ loop antenna even though the maximum AD value falls in the $11^{th}$ loop antenna. Therefore, the position of the electromagnetic pointer should be changed to the $10^{th}$ loop antenna.

By reviewing above results, it can be discovered that the value of Index 1 is not large and its range is narrow when the incline angle of the electromagnetic pointer is small or when the electromagnetic pointer is located at different percentages of position. Accordingly, when the value of Index1 is not large, it is needed to determine which circumstance makes this, either the small incline angle or the position percentage at where the electromagnetic pointer is located.

Assuming that the inductive distance between the electromagnetic pointer and the digitizer is 6 mm, consider the following two conditions, i.e., (1) the electromagnetic pointer is at right angles and is located at 30% position of the $10^{th}$ loop antenna, and (2) the electromagnetic pointer is located at 40% position of the $10^{th}$ loop antenna but inclines toward the left side for 10°. The AD values of the $7^{th}$ to $13^{th}$ loop antennas, sensed respectively in the two conditions, are listed below.

TABLE 6

| Loop | 30%<br>0° | 40%<br>L10° |
|------|-----------|-------------|
| 7    | 32974     | 32957       |
| 8    | 34695     | 34636       |
| 9    | 36934     | 36880       |
| 10   | 37542     | 37490       |
| 11   | 36127     | 36076       |
| 12   | 33845     | 33906       |
| 13   | 32992     | 32972       |

Next, compare the values of Index1 and Index2, and estimate a shifting ratio of the electromagnetic pointer by using the aforesaid formula (1). The results are listed in the following table.

TABLE 7

|                | 30%<br>0° | 40%<br>L10° |
|----------------|-----------|-------------|
| Shifting Ratio | 0.3005    | 0.3014      |
| Index1         | 6.90095   | 7.39953     |
| Index2         | 3.09414   | 5.25327     |

As can be seen, under the two conditions, the shifting ratios are very close and the values of Index1 as well. However, the values of Index2 are significantly different from each other. Accordingly, when the value of Index1 is smaller than a predetermined value (e.g., 10), the value of Index2 can be used to determine whether the electromagnetic pointer inclines or the position shifting occurs.

Further, the following is to observe the variations of Index1 and Index2 values when the electromagnetic pointer is at right angles but is located at different percentages of position. The results are shown below.

TABLE 8

|        | 0%    | 10%   | 20%   | 30%   | 40%   | 50%   | 60%   | 70%   | 80%    | 90%    |
|--------|-------|-------|-------|-------|-------|-------|-------|-------|--------|--------|
| Index1 | 7.195 | 7.370 | 6.825 | 6.901 | 6.839 | 7.115 | 6.988 | 6.940 | 7.627  | 8.069  |
| Index2 | 6.146 | 4.859 | 4.528 | 3.094 | 2.658 | 2.121 | 1.942 | 0.768 | −0.004 | −1.077 |

Also, in the case that the electromagnetic pointer inclines toward the right side, the following is to observe the variations of Index1 values, Index2 values, and shifting ratios when the electromagnetic pointer is located at 30% position of the 10$^{th}$ loop antenna but inclines at different angles. The results are shown below.

TABLE 9

|  | 0% | 10% | 20% | 30% | 40% | 50% |
|---|---|---|---|---|---|---|
| Shifting Ratio | 30.05% | 45.84% | 56.95% | 67.91% | 73.60% | 88.57% |
| Index1 | 6.901 | 6.993 | 6.913 | 7.950 | 7.769 | 9.966 |
| Index2 | 3.094 | −0.354 | −4.137 | −8.834 | −13.876 | −21.629 |

As can be seen, when the electromagnetic pointer is located at different position percentages, the value of Index1 changes slightly but the value of Index2 decreases as the position percentage increases. When the incline angles differ, the value of Index1 changes little but the value of Index2 decreases as the incline angle increases. Its decreasing rate is more significant in this situation. By comparing a case that the electromagnetic pointer is at right angles and is located at 70% position with another case that the electromagnetic pointer inclines toward the right side at 40° and is located at 30% position, it shows that their shifting ratios are very close (70% vs. 73.6%) but their Index2 values respectively are 0.768 and −13.876. Accordingly, whether the electromagnetic pointer inclines or whether the electromagnetic pointer has a position shifting can be determined by using the value of Index2. If the determination indicates that the electromagnetic pointer has the position shifting, the position percentage at where the electromagnetic pointer is located can be calculated by using the formula (1) since the incline angle for this case is not large and the tilt of the electromagnetic pointer has a little influence on the signal distribution.

By reviewing above experimental results, a conclusion can be drawn as follows. When the value of Index1 is smaller than a predetermined value, the position of the electromagnetic pointer and the maximum AD value may fall in the same loop antenna and thus the value of Index2 may be used to determine that the electromagnetic pointer inclines or the electromagnetic pointer has the position shifting. Also, the incline angle of the electromagnetic pointer can be obtained by using the value of Index2. When the value of Index1 is greater than a predetermined value, the position of the electromagnetic pointer and the maximum AD value may fall in different loop antennas and thus the value of Index1 can be used to estimate the incline angle of the electromagnetic pointer at this time.

Finally, the inductive distance between the electromagnetic pointer and the digitizer also affects the rate of change of the curve. This also results in different position compensation even though the electromagnetic pointer inclines at the same angle and is located at the same position. The explanations are accompanied with the experimental data as follows. Assuming that the electromagnetic pointer is at right angles and is located at 50% position of the 10$^{th}$ loop antenna, consider the following two conditions, i.e., (1) the inductive distance between the electromagnetic pointer and the digitizer is 2 mm, and (2) the inductive distance between the electromagnetic pointer and the digitizer is 6 mm. The AD values of the 7$^{th}$ to 13$^{th}$ loop antennas, sensed respectively in the two conditions, are listed below.

TABLE 10

| Loop | 2 mm | 6 mm |
|---|---|---|
| 7 | 33271 | 32950 |
| 8 | 33644 | 34170 |
| 9 | 36377 | 36482 |
| 10 | 37510 | 37514 |
| 11 | 36392 | 36507 |
| 12 | 33704 | 34282 |
| 13 | 33189 | 32948 |

Next, compare the values of Index1, DeltaL, DeltaR, and Index2, and estimate a shifting ratio of the electromagnetic pointer by using the aforesaid formula (1). The results are listed in the following table.

TABLE 11

|  | 2 mm | 6 mm |
|---|---|---|
| Shifting Ratio | 0.5033 | 0.5061 |
| Index1 | 6.009 | 7.115 |
| DeltaL | 22.643 | 15.217 |
| DeltaR | 20.125 | 13.096 |
| Index2 | 2.518 | 2.121 |

As can be seen, under the two conditions, the shifting ratios are very close and the values of Index1 and Index2 as well. However, the values of DeltaL and DeltaR are significantly different from each other. When the inductive height or distance is fixed, the variables DeltaL and DeltaR respectively have a certain fixed range of values for various incline angles. Accordingly, the values of DeltaL and DeltaR can be used to determine the inductive distance between the electromagnetic pointer and the digitizer.

The position compensation difference is more apparent when the electromagnetic pointer inclines at a large angle. When the electromagnetic pointer inclines toward the left side at 50° and the inductive heights respectively are 2 mm and 6 mm, the following shows an amount of position to be compensated for the respective ranges of shifting ratios (not actual shifting ratios). The inductive height is 2 mm for Table 12 and is 6 mm for Table 13.

TABLE 12

| Shifting Ratio | Amount of compensation for position |
|---|---|
| 0%~9% | 50% |
| 10%~19% | 50% |
| 20%~29% | 51% |
| 30%~39% | 49% |
| 40%~56% | 48% |
| 57%~59% | 52% |
| 60%~69% | 50% |
| 70%~79% | 52% |
| 80%~89% | 51% |
| 90%~99% | 52% |

TABLE 13

| Shifting Ratio | Amount of compensation for position |
|---|---|
| 0%~9% | 50% |
| 10%~19% | 41% |
| 20%~29% | 43% |
| 30%~39% | 44% |
| 40%~56% | 43% |
| 57%~59% | 43% |

TABLE 13-continued

| Shifting Ratio | Amount of compensation for position |
|---|---|
| 60%~69% | 43% |
| 70%~79% | 47% |
| 80%~89% | 40% |
| 90%~99% | 50% |

Theoretically, there exists particular functions for the respective variables as defined above. The value of Index1 can be used to determine whether the maximum AD value and the electromagnetic pointer fall in the same loop antenna (while sometimes it needs to accompany with Index2 to aid the determination). The value of Index2 can be used to determine the incline angle. The values of DeltaL and DeltaR can be used to determine the inductive distance between the electromagnetic pointer and the digitizer. The following is to describe the present invention by taking an example that seven loop antennas are scanned in a local scan profile, in accompanying with an incline angle determination method shown in FIG. 7.

Figure 7:
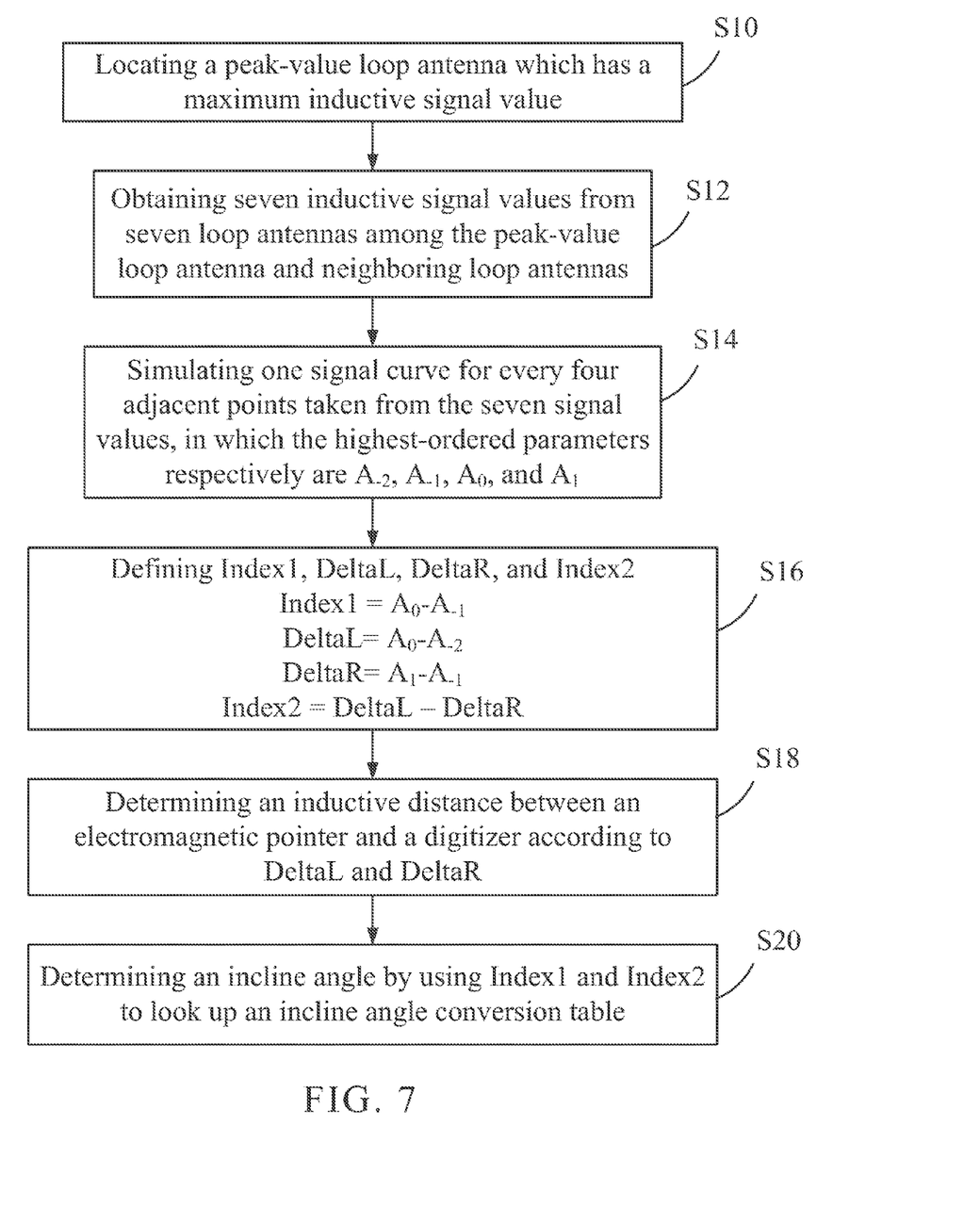
FIG. 7 is a flow chart of a method for determining an incline angle of an electromagnetic pointer according to the present invention.

In Step S10, a global scan is performed in order to initially determine which one of the loop antennas is relatively near to the electromagnetic pointer. The nearest loop antenna usually has a maximum sensing signal value, and this loop antenna is called a peak-value loop antenna herein.

In Step S12, a local scan is performed. That is to say, plural loop antennas that are near to the peak-value antenna are scanned in this step so as to obtain sensing signal values of the peak-value loop antenna and the neighboring loop antennas and thus obtain a signal distribution. In this circumstance, the total number of the peak-value loop antenna and the neighboring loop antennas is seven. That is, there are seven sensing signal values corresponding to the seven loop antennas.

In Step S14, simulate signal curves by using the signal values sensed by the peak-value loop antenna and the loop antennas near to the peak-value loop antenna. By using the aforesaid manner to select signal points, seven signal values are used to simulate four signal curves when a cubic equation in one variable is utilized. In this circumstance, by utilizing the cubic equation in one variable, one signal curve can be simulated for every four adjacent points taken from the seven signal values. The highest-ordered parameters for the four signal curves obtained from the simulation respectively are $A_{-2}$, $A_{-1}$, $A_0$, and $A_1$, listed from the left to the right. Further, these four parameters can be normalized as described above, for being applicable to a situation that the AD values differ due to the change of the gain of the amplifier.

In Step S16, the rate of change between the signal curves is calculated. In this circumstance, the variables Index1, DeltaL, DeltaR, and Index2 are defined as shown in the afore-mentioned formula (3).

In Step S18, the inductive distance between the electromagnetic pointer and the digitizer are determined according to the values of DeltaL and DeltaR. For each specific incline angle, the values of Index1 and Index2 may alter when the inductive height or distance differs. Accordingly, for a certain inductive height, a corresponding incline angle conversion table should be adopted. The incline angle conversion table is a table on which the incline angle and position percentage are in comparison with Index1 and Index2 for a specific inductive height. This conversion table is made by the personnel who performs measurement under various different position percentages, incline angles, and inductive heights.

In Step S20, inquire or look up the incline angle conversion table by using the values of Index1 and Index2 so as to obtain a corresponding incline angle of the electromagnetic pointer. Firstly, whether the coordinate of the electromagnetic pointer falls into the peak-value loop antenna is to be determined. When the value of Index1 is smaller than a predetermined value, it means that the incline angle is not large and may determine that the coordinate of the electromagnetic pointer falls into an occupied range of the peak-value loop antenna. Sometimes, however, the value of Index1 may not apparently change with the incline angle. It may need to accompany with the value of Index2 to determine whether the coordinate of the electromagnetic pointer falls into the range of the peak-value loop antenna. Accordingly, whether the coordinate of the electromagnetic pointer and the maximum AD value fall in the same loop antenna can be determined by using the value of Index1 in accompanying with the value of Index2. The values of Index2 show a notable difference when the determination indicates that the coordinate of the electromagnetic pointer and the maximum AD value fall in the same loop antenna. Meanwhile, the value of Index2 can be used to look up the incline angle conversion table so as to obtain a corresponding incline angle of the electromagnetic pointer. Also, linear interpolation may be used to calculate the position percentage of the electromagnetic pointer. It means that the incline angle is larger when the determination indicates that the coordinate of the electromagnetic pointer and the maximum AD value fall in different loop antennas. In this situation, the values of Index2 may be affected but the values of Index1 show a notable difference. Meanwhile, the value of Index1 can be used to look up the incline angle conversion table so as to obtain a corresponding incline angle of the electromagnetic pointer.

In one embodiment, when the value of Index1 is smaller than a predetermined value (e.g., 9), it can be determined that the coordinate of the electromagnetic pointer falls into the range of the peak-value loop antenna. When the value of Index1 is greater than the predetermined value and the value of Index2 is smaller than −12, it can be determined that the coordinate of the electromagnetic pointer does not fall into the range of the peak-value loop antenna. Otherwise, it may still determine that the electromagnetic pointer falls in the peak-value loop antenna.

The following will be described by using two examples. In Example I, assuming that the maximum AD value appears in the $10^{th}$ loop antenna and the electromagnetic pointer inclines at a certain angle which is unknown, the signal values of the $7^{th}$ to $13^{th}$ loop antennas (i.e., seven entities in total) are listed below.

TABLE 14

| | |
|---|---|
| 7 | 33050 |
| 8 | 34313 |
| 9 | 36420 |
| 10 | 37501 |
| 11 | 36473 |
| 12 | 33988 |
| 13 | 33292 |

Next, the values of shifting ratio, Index1, Index2, DeltaL, and DeltaR are calculated from the AD values listed in Table 14. These values respectively are 51.26%, 7.85, −7.81, 11.98, and 11.79. Firstly, the inductive height can be determined as 6 mm by using the values of DeltaL and DeltaR. Since the value of Index1 is smaller than a predetermined value (e.g., 8), it can be determined that the incline angle is not large. Because the value of Index1 is not large, it has better to use the value of Index2 to aid the determination. In this case, a range −15<Index2<21 can be used for the determination. As can be determined, the maximum AD value and the electromagnetic pointer fall into the same loop antenna. The shifting ratio 51.26% can be used firstly to look up the conversion table. A part of the conversion table is shown as below.

TABLE 15

|  | Shifting Ratio | Index1 | DeltaL | DeltaR | Index2 |
| --- | --- | --- | --- | --- | --- |
| 90% R50 | 47.13% | 9.14 | 12.35 | 33.27 | −20.92 |
| 10% R40 | 57.77% | 8.3 | 11.25 | 24.74 | −13.49 |
| 10% R30 | 50.97% | 7.24 | 11.96 | 19.58 | −7.62 |
| 25% R20 | 54.75% | 7.175 | 12.615 | 16.395 | −3.78 |
| 40% R10 | 53.24% | 7.05 | 13.14 | 14.23 | −1.09 |
| 50% Vertical | 50.61% | 7.11 | 15.21 | 13.1 | 2.11 |
| 65% L10 | 55.07% | 7.065 | 17.925 | 12.255 | 5.67 |
| 70% L20 | 50.02% | 7.47 | 20.94 | 11.57 | 9.37 |
| 80% L30 | 51.93% | 8.3 | 25.7 | 11.47 | 14.23 |
| 90% L40 | 53.55% | 8.95 | 32.37 | 12.04 | 20.33 |
| 0% L50 | 59.84% | 10.88 | 36.92 | 13.8 | 23.12 |

Next, look up the conversion table (i.e., Table 15) to find out the closest one to the value of Index2 (i.e., −7.81). It can be determined that the inclined angle is 30° toward the right side and the position percentage is 10%. Finally, linear interpolation is utilized to make the result more accurate. The final result is that the electromagnetic pointer inclines toward the right side at 30.3° and is located at 9% position of the loop antenna.

In Example II, assuming that the maximum AD value appears in the 11$^{th}$ loop antenna and the electromagnetic pointer inclines at a certain angle which is unknown, the signal values of the 8$^{th}$ to 14$^{th}$ loop antennas (i.e., seven entities in total) are listed below.

TABLE 16

| 8 | 33002 |
| --- | --- |
| 9 | 33983 |
| 10 | 36433 |
| 11 | 37432 |
| 12 | 35942 |
| 13 | 32868 |
| 14 | 34441 |

Next, the values of shifting ratio, Index1, Index2, DeltaL, and DeltaR are calculated from the AD values listed in Table 16. These values respectively are 40.14%, 8.78, −15.29, 18.35, and 33.64. Firstly, the inductive height can be determined as 2 mm by using the values of DeltaL and DeltaR. A conversion table corresponding to 2 mm inductive height and 40% shifting ratio is used to obtain the actual shifting ratio. The value of Index2 is utilized since the value of Index1 is unable to determine whether the maximum AD value and the electromagnetic pointer fall in the same loop antenna. Because the value of Index2 is smaller than −12, it can be determined that the loop antenna the maximum AD value falling into is different from the loop antenna at where the electromagnetic pointer is placed. The electromagnetic pointer is supposed to be placed at the 10$^{th}$ loop antenna. At this time, the incline angle is large. The actual position of the electromagnetic pointer can be acquired by using the following table.

TABLE 17

|  | Shifting Ratio | Index1 | DeltaL | DeltaR | Index2 |
| --- | --- | --- | --- | --- | --- |
| 90% R50 | 45.47% | 10.49 | 19.18 | 39.47 | −20.29 |
| 90% R40 | 39.76% | 8.4 | 18.56 | 33.26 | −14.7 |
| 5% R30 | 43.83% | 8.005 | 19.48 | 29.79 | −10.31 |
| 20% R20 | 45.78% | 7.19 | 20.2 | 25.59 | −5.39 |

TABLE 17-continued

|  | Shifting Ratio | Index1 | DeltaL | DeltaR | Index2 |
| --- | --- | --- | --- | --- | --- |
| 30% R10 | 41.81% | 6.04 | 20.83 | 21.49 | −0.66 |
| 40% Vertical | 40.23% | 6.04 | 22.35 | 18.86 | 3.49 |
| 55% L10 | 45.78% | 6.505 | 26.17 | 18.11 | 8.06 |
| 65% L20 | 42.00% | 6.815 | 29.85 | 16.17 | 13.68 |
| 80% L30 | 47.59% | 7.88 | 35.28 | 16.06 | 19.22 |
| 90% L40 | 47.76% | 8.62 | 40.16 | 15.76 | 24.4 |
| 90% L50 | 41.67% | 11.38 | 46.7 | 14.55 | 32.15 |

Since the loop antenna the maximum AD value falling into is different from the loop antenna at where the electromagnetic pointer is placed, the value of Index1 (i.e., 8.78) can be used to look up the conversion table (i.e., Table 17) to find out the closest one. The final result is that the electromagnetic pointer inclines toward the right side at 41.81° and is located at 90.38% position of the 10$^{th}$ loop antenna.

In the present invention, at least two signal curves are simulated by using the signal values sensed by the loop antennas and the incline angle of the electromagnetic pointer is estimated on a basis of the rate of change between every two signal curves. In this approach, the incline angle can be determined by scanning only five to seven loop antennas. A filtering algorithm and historical tracks also may be incorporated to acquire more accurate incline angle when few loop antennas are scanned. Also, compared to determining the incline angle by scanning lots of loop antennas (e.g., 13 entities) in a conventional method, the present invention can reduce the number of loop antennas required to be scanned and increase the efficiency of incline angle determination, thereby shrinking the inactive area on the periphery of the digitizer and enlarging the range of effective area.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A method for determining an incline angle of an electromagnetic pointer, the electromagnetic pointer being positioned on or above a digitizer, the digitizer having a plurality of loop antennas, said method comprising steps of:
    A. locating a peak-value loop antenna which has a maximum inductive signal value;
    B. scanning plural loop antennas that are near to the peak-value loop antenna and obtaining seven inductive signal values from seven loop antennas among the peak-value loop antenna and the neighboring loop antennas;
    C. simulating one signal curve with a cubic equation in one variable for every four adjacent points taken from the seven signal values, in which highest-ordered parameters for four signal curves obtained from the simulation respectively are $A_{-2}$, $A_{-1}$, $A_0$, and $A_1$ in order;
    D. defining following variables by calculating variations among the signal curves:

$$Index1 = A_0 - A_{-1}$$

$$DeltaL = A_0 - A_{-2}$$

$$\text{Delta}R = A_1 - A_{-1}$$

$$\text{Index2} = \text{Delta}L - \text{Delta}R;$$

E. determining an inductive distance between the electromagnetic pointer and the digitizer according to values of DeltaL and DeltaR; and F. determining an incline angle of the electromagnetic pointer by using values of Index1 and Index2 to look up an incline angle conversion table.

2. The method according to claim 1, wherein in Step A, the peak-value loop antenna having the maximum inductive signal value is determined when a global scan is carried on.

3. The method according to claim 1, wherein in Step B, the inductive signal values of the neighboring loop antennas are acquired when a local scan is carried on.

4. The method according to claim 1, wherein the highest-ordered parameters $A_{-2}$, $A_{-1}$, $A_0$, and $A_1$ are normalized in Step C and then in Step D, the variations are calculated.

5. The method according to claim 1, wherein in Step E, the incline angle conversion table varies with different inductive distances.

6. The method according to claim 1, wherein in Step F, the incline angle conversion table is a table on which the incline angle and position percentage are in comparison with Index1 and Index2.

7. The method according to claim 1, wherein Step F comprises steps of:

F1. determining whether a coordinate of the electromagnetic pointer falls into a range of the peak-value loop antenna;

F2. using a value of Index2 to look up the incline angle conversion table so as to obtain a corresponding incline angle of the electromagnetic pointer when the coordinate of the electromagnetic pointer falls into the range of the peak-value loop antenna; and F3. using a value of Index1 to look up the incline angle conversion table so as to obtain the corresponding incline angle of the electromagnetic pointer when the coordinate of the electromagnetic pointer does not fall into the range of the peak-value loop antenna.

8. The method according to claim 7, wherein whether the coordinate of the electromagnetic pointer falls into the range of the peak-value loop antenna or not is determined according to the values of Index1 and Index2.

\* \* \* \* \*